Sept. 12, 1944.   A. C. HOOF   2,358,228
VALVE
Filed Nov. 20, 1942
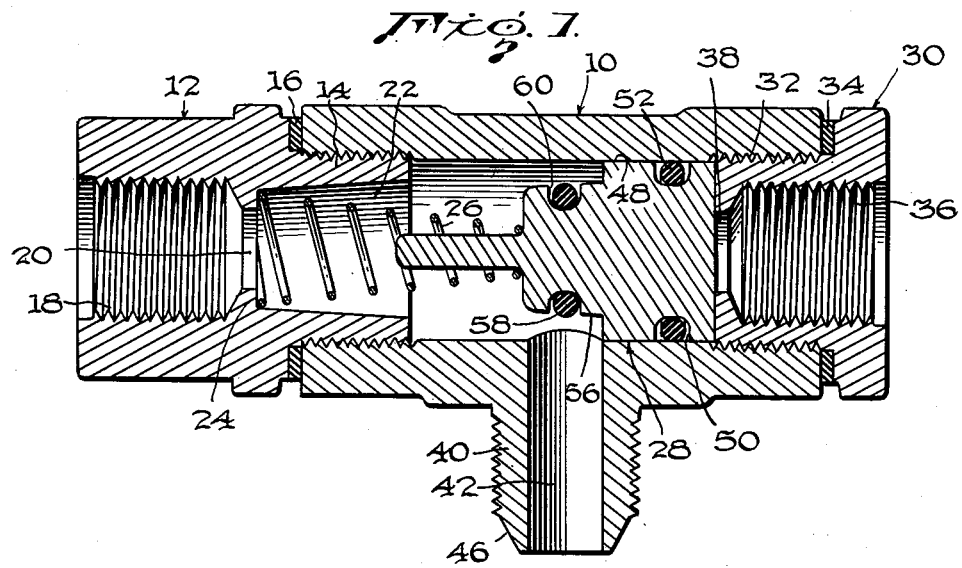
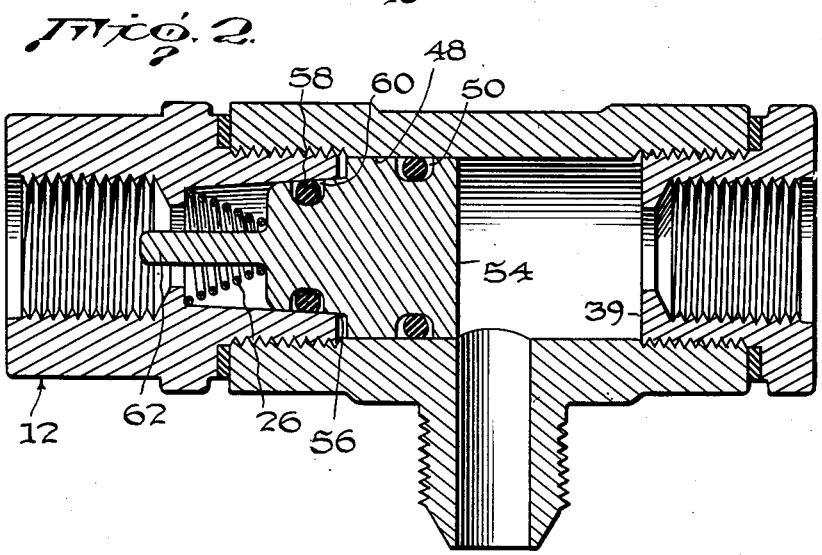
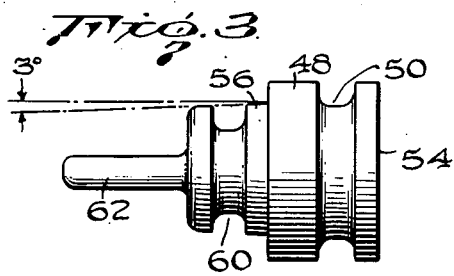
INVENTOR.
ADDISON C. HOOF
BY
his ATTORNEY Patented Sept. 12, 1944

2,358,228

UNITED STATES PATENT OFFICE 2,358,228

VALVE

Addison C. Hoof, Hinsdale, Ill.

Application November 20, 1942, Serial No. 466,349

4 Claims. (Cl. 251—118)

The present invention relates to a hydraulic safety device and more particularly to an automatic valve permitting independent application of hydraulic control pressure of any of a plurality of sources.

Yet more particularly the present invention contemplates the provision of a unit applicable to hydraulic systems and automatically responsive under conditions of emergency to permit operation of the system from an auxiliary source of hydraulic pressure. Widespread extension of hydraulic control has resulted in an application of such systems to relationships wherein continued operability becomes of important significance, such for example as in aircraft controls. Such hydraulic systems are at all times subject to failure and to depletion of the hydraulic fluid, rendering impossible the maintenance and creation of the pressure differential necessary to operate pressure responsive mechanical instrumentalities.

The present invention accordingly contemplates the provision of a control unit normally in communication with an auxiliary source of fluid pressure as well as a main source of fluid pressure and operable automatically upon failure of the main source of fluid pressure to seal off said source and place the auxiliary source of pressure in control. In this respect, therefore, the present invention is directed to somewhat the same problem as that attacked in accordance with my copending application Serial No. 415,618, filed March 12, 1942, and is particularly adaptable for use in systems of the type therein disclosed.

It is an important object achieved by the present invention to provide a hydraulic control valve useful with hydraulic systems of the above character and normally operating to maintain direct communication between a main operative source of hydraulic pressure and a mechanical instrumentality operated thereby, automatically transferable upon application of pressure from an auxiliary source at a time of failure of the main source of pressure, to effectively seal off communication of the main source and effect communication between the operating instrumentality and the auxiliary source.

It is yet more specifically an object of the present invention to provide a construction as above wherein the failure of the main source of pressure and consequent utilization of the auxiliary source of pressure results in a permanent or positive sealing action whereby the main source remains permanently sealed in spite of variation or removal of pressure at the auxiliary source. The attainment of this object thereby permits the auxiliary source to be operated in any desired manner so as to repeatedly control the operating instrumentalities over extended periods of time and under varying hydraulic conditions without fear of loss of hydraulic fluid.

Other and further objects will be apparent from a consideration of the following specification when taken in conjunction with the accompanying drawing, wherein Fig. 1 is a sectional view taken centrally through a valve constructed in accordance with the present invention;

Fig. 2 is a sectional view identical with that shown in Fig. 1 but illustrating the position of the parts upon failure of the usual source of hydraulic pressure and application of the auxiliary pressure from the auxiliary source; and Fig. 3 is an elevational view of a shiftable shuttle valve element shown in Figs. 1 and 2.

Referring now to Figs. 1 and 2, wherein there is illustrated one preferred form of construction embodying the principles of the present invention, it will be seen that there is employed a transfer or shuttle type valve construction comprising a central chamber or body portion 10 which in the present instance is of generally cylindrical form. The central body portion is provided at its left-hand-most extremity with an inlet fitting 12 threadedly interengaged therewith as at 14 and spaced by a packing washer 16. The inlet fitting 12 is threaded, as at 18, to receive a suitable complementary fitting associated with the extremity of a conduit, not shown, leading to a normally operable source of hydraulic pressure. The aperture formed by the internal portion 18 communicates at its inner extremity with a passageway 20 which in turn communicates with an enlarged tapered passageway 22, the function of which will be hereinafter described more in detail. An annular shoulder portion 24 between the two last-named passageways seats the extremity of a helical coil spring 26. The opposite extremity of the helical coil spring 26 acts against a shiftable valve or shuttle element 28. The coned helical spring 26, which engages the projection 62 on the valve, is sufficient to hold the valve closely to its seat, closing the auxiliary inlet, and at the same time, as shown in Figure 2, when the valve is moved to the left hand position in the casing, is readily housed within the tapered interlocking seat of the valve without any danger of jamming.

The cylindrical chamber 10 is provided with a second inlet fitting 30 threadedly received as at 32 and sealingly engaged therewith through the agency of an annular packing washer 34. The second or auxiliary inlet fitting 30 is internally threaded, as at 36, to receive an appropriate complementary fitting on the extremity of a conduit leading from the auxiliary pressure source, and the recess thus formed communicates with the interior of the chamber 10 through passageway 38. The inner extremity of the fitting 30 provides a flat face or shoulder 39 adapted to coact with the extremity of the shuttle member 28, as illustrated.

Outlet from the chamber is afforded by means of a radially extending embossment or projection 40 provided with a central passageway or bore 42 and externally provided with a suitable helical thread 44 and a tapered extremity 46 to receive a complementary hydraulic pressure fitting or an outlet conduit, not shown, leading to any suitable hydraulic instrumentality.

The internal valve element or shuttle member 28, as shown more clearly in Fig. 3, comprises a main cylindrical body portion 48 slidable within the cylindrical bore of the chamber 10 in freely axially shiftable relationship. Accordingly the clearance provided is just sufficient to permit free mechanical movement in the path determined by the length of the cylindrical chamber. The cylindrical body portion 48 is, intermediate of its extremity, provided with an annular channel or groove 50 adapted to receive an annular resilient sealing ring 52. As is known in the art, the depth of the groove 50 should preferably bear a relation to the sectional diameter of the sealing ring 52, such that a peripheral portion of the sealing ring normally tends to project slightly outwardly beyond the surface of the cylindrical body member 48. In short, the radial depth of the groove or channel 50 is less than the normal sectional dimension of the ring 52 whereby the ring bears resiliently against the inner cylindrical surface of the valve chamber, thus forming a positive seal, and preventing passage of hydraulic fluid past the shuttle member. Further, in accordance with the preferred practice the groove has an axial dimension slightly larger than the usual axial dimension of the sealing ring, thus permitting a working action between the sealing ring and the shuttle or piston member 28 when the parts are relatively actuated.

The right-hand-most extremity of the shuttle member 54 preferably, though not necessarily, resides in a plane normal to the axis of the chamber and is thus adapted to complementarily or flatwise engage the face or shoulder portion 39 of the auxiliary inlet fitting.

It is particularly important to note that the shuttle or valve element is adapted to engage with the inlet pressure fitting 12 in more or less permanent sealing engagement and to this end the shuttle member is provided with a projecting portion of reduced diameter, as at 56. This reduced diameter projection is provided with a tapered outer surface complementary to the tapered wall of the recess 22. Particular attention is directed to the fact that the complementary tapered surfaces are so selected as to result in a frictional holding inter-engagement when the parts are associated in operative relationship, as shown in Fig. 2. Thus, in accordance with the present invention, the complementary valve portions are formed with a so-called self-holding taper, such that gripping inter-engagement occurs. Such tapers are well known in the machine arts and have been standardized for use in mounting drill shanks, lathe centers and other machine parts. While the preferred degree of taper may vary in accordance with the diameter of the parts, nevertheless it has been found that the advantages of the present invention are available where the included angle between the taper and the axis of the shuttle is 5° or less. Yet more specifically, and illustrating one preferred form of construction wherein the base diameter of the tapered projection is approximately one-half inch, the foregoing angle is advantageously equal to 3°. This, however, may vary widely within the foregoing range and advantageously should be varied from the foregoing optimum in a straight line relationship according to the base diameter. It will be seen that the shuttle valve is made up of a relatively large cylindrical portion which normally closes the auxiliary inlet valve and the relatively small coned portion which interlocks with the cone seat 22 at the main inlet. The proportioning of the valve seating members in this manner gives a construction which acts with very considerable force and promptly, in response to fluid pressure coming through the auxiliary inlet. The large seating surface of the cylindrical portion of the valve gives a quick and powerful impulse to the shuttle valve and drives the coned portion of the valve forcibly to interlocking position in the cone valve seat in the main inlet.

This self-holding action is materially enhanced by provision of a resilient sealing ring 58 of substantially the same construction as the foregoing sealing ring 52. The sealing ring 58 is disposed within an annular channel or groove 60 of substantially the same characteristics as the channel 50. The groove 60 is, as shown in all the figures, disposed axially intermediate of the tapered surface 56 and accordingly when the parts are urged to the position shown in Fig. 2 the peripheral projecting portion of the resilient sealing ring 58 engages yieldably against the inner tapered surface of the recess 22. In addition to the improved holding effect it is evident that the parts become thus hermetically sealed against leakage.

It will be seen from the foregoing that the present construction has the additional advantage of permitting ready operative interassociation of the parts. Thus it is apparent that the sealing ring 58 is, by virtue of the tapered configuration, permitted to freely pass into the mouth of the relatively wide chamber 12 without a tendency to be dislodged from or undesirably distorted in its channel and this construction it will be seen affords a new mode of utilization of sealing rings of the present character.

The left-hand-most extremity of the shuttle valve member, as viewed in the figures, is provided with an axially projecting pin or protuberance 62 performing the dual function of seating and axially aligning the helical coil spring 26, and providing a portion, which is engageable for urging the shuttle member away from the frictionally held position shown in Fig. 2 and back to the normal position represented in Fig. 1.

From the foregoing it will be apparent that in operation the parts are normally in the position shown in Fig. 1, affording direct communication between the inlet 12 and the outlet 40. Upon failure of pressure at the inlet 12 and application of an emergency pressure at the inlet 30 the shuttle shifts immediately to the locking position shown in Fig. 2 wherein the shuttle becomes frictionally held or interlocked with the original inlet fitting. At this time it can no longer return under the influence of the spring 26 and the system thus remains sealed against leakage by way of fitting 12 and associated conduits.

The present construction accordingly permits maintenance of the sealing inter-engagement of the parts in spite of wide variation or release of pressure at the fitting 30. The system may thus be repeatedly energized in widely varying manners to actuate, release or otherwise modify as desired the mechanical instrumentalities under control of the hydraulic system. In many other constructions with which I am familiar, protection is afforded only so long as pressure from the auxiliary source is maintained. The present invention obviates this difficulty and permits utilization of the auxiliary source of pressure over extended periods of time.

The shuttle valve may be released upon application of mechanical force to the pin 62 or by application of a substantial predetermined fluid pressure to the fitting 12. When returned to normal position the sealing ring 52 functions to prevent leakage although it will be appreciated that with the auxiliary source normally closed, and under the holding influence of the helical spring 26 release of fluid at this point is not normally a serious problem.

Obviously the invention is not limited to the specific structural arrangement disclosed herein but is capable of further modifications and changes without departing from the spirit and scope of the disclosure.

What I claim is:

1. An hydraulic transfer valve for fluid pressure systems comprising a chambered casing having a main inlet, an outlet, and an auxiliary inlet; a valve having a relatively large seating face for closing the auxiliary inlet and a relatively small seat-interlocking face to engage the main inlet; a sealing ring circumferentially of said relatively large valve portion; a sealing ring circumferentially of the relatively small portion of said valve, and means to hold said valve normally in position closing the auxiliary inlet.

2. An hydraulic transfer valve for fluid pressure systems comprising a chambered casing having a main inlet, an outlet, and an auxiliary inlet; a coned valve-interlocking seat at the main inlet; a valve having a relatively large seating face subject to auxiliary inlet pressure for closing the auxiliary inlet and a relatively small coned seat-interlocking face to engage the coned seat of the main inlet; a sealing ring circumferentially of said relatively large valve portion; a sealing ring circumferentially of said relatively small valve portion; a spring engaging projection extending from the smaller end of the valve, and a coned helical spring engaging said projection and seated with the coned seat of the main outlet.

3. A shuttle valve for pressure systems having a relatively large cylindrical body portion provided with an inlet closing face, a relatively small coned portion for closing an opposite inlet, and a spring-engaging and valve-unseating projection extending longitudinally from said coned valve portion.

4. A shuttle valve for pressure systems having a relatively large cylindrical body portion provided with an inlet closing face and having a circumferential sealing ring groove, a relatively small coned portion for closing an opposite inlet having a circumferential sealing ring groove, and a spring-engaging and valve-unseating projection extending longitudinally from said coned valve portion.

ADDISON C. HOOF.